(12) United States Patent
Clarke

(10) Patent No.: US 7,107,802 B2
(45) Date of Patent: Sep. 19, 2006

(54) WHEEL IMMOBILIZER

(76) Inventor: John Clarke, 7491 Aubrey Street, Burnaby, British Columbia (CA) V5A 1K6

( * ) Notice: Subject to any disclaimer, the term of this patent is extended or adjusted under 35 U.S.C. 154(b) by 0 days.

(21) Appl. No.: 10/839,223

(22) Filed: May 6, 2004

(65) Prior Publication Data

US 2005/0247087 A1   Nov. 10, 2005

(51) Int. Cl.
B60R 25/00 (2006.01)
(52) U.S. Cl. .............. 70/226; 70/209; 70/14; 188/32
(58) Field of Classification Search ......... 70/225, 70/226, 237, 259, 260, 14, 18, 19, 209; 180/287; 188/32; 410/9, 10, 12, 19, 20, 30; 280/402
See application file for complete search history.

(56) References Cited

U.S. PATENT DOCUMENTS

| | | | | |
|---|---|---|---|---|
| 1,429,334 A * | 9/1922 | Furber | | 70/209 |
| 1,488,893 A * | 4/1924 | Plouffe | | 70/226 |
| 1,545,287 A * | 7/1925 | Stephenson | | 70/193 |
| 2,475,111 A * | 7/1949 | Ridland | | 188/32 |
| 2,969,993 A * | 1/1961 | Jasper | | 280/433 |
| 3,457,745 A * | 7/1969 | Barber | | 70/424 |
| 3,462,982 A * | 8/1969 | Moore | | 70/209 |
| 3,695,071 A | 10/1972 | West | | |
| 4,651,849 A | 3/1987 | Givati | | |
| 4,819,462 A | 4/1989 | Apsell | | |
| 4,854,144 A | 8/1989 | Davis | | |
| 4,949,561 A * | 8/1990 | Solow et al. | | 70/209 |
| 5,119,651 A * | 6/1992 | Yang | | 70/52 |
| 5,214,944 A | 6/1993 | Wolthoff | | |
| 5,297,406 A * | 3/1994 | Lin | | 70/209 |
| 5,315,848 A | 5/1994 | Beyer | | |
| 5,333,477 A | 8/1994 | Davis | | |
| 5,363,679 A * | 11/1994 | Prasad | | 70/209 |
| 5,410,897 A | 5/1995 | Edmondson | | |
| 5,437,171 A | 8/1995 | Owen | | |
| 5,676,000 A * | 10/1997 | Chen | | 70/209 |
| 5,706,682 A | 1/1998 | Barker | | |
| 5,715,711 A | 2/1998 | Jennison | | |
| 5,735,150 A * | 4/1998 | Desouza | | 70/209 |
| 5,755,124 A * | 5/1998 | Chang | | 70/209 |
| 5,890,382 A * | 4/1999 | Wang | | 70/209 |
| 5,921,120 A * | 7/1999 | Wu | | 70/209 |
| 5,927,108 A | 7/1999 | Pierce | | |
| 6,099,219 A * | 8/2000 | Bartholomay | | 410/20 |

(Continued)

FOREIGN PATENT DOCUMENTS

EP   0 080 893 B1   6/1983

*Primary Examiner*—Suzanne Dino Barrett
(74) *Attorney, Agent, or Firm*—Norman M Cameron (57) ABSTRACT

An immobilization apparatus for a vehicle having a wheel with a tire. The apparatus comprises first and second elongated members having inner ends and outer ends. The inner ends are connected together and the outer ends are angularly spaced apart. There is an L-shaped clasp at each of the outer ends for grasping the tire. The clasps are rotatable about the outer ends. A third elongated member has an inner portion and an outer portion and is angularly spaced-apart from the first and second members. The inner portion is tubular and the outer portion of the third elongated member is telescopically received therein. The outer portion has an L-shaped clasp, and the outer portion is rotatable with respect to the inner portion. A locking mechanism secures the outer portion at a fixed telescopic position with respect to the inner portion of the third elongated member.

10 Claims, 10 Drawing Sheets

U.S. PATENT DOCUMENTS

| | | | |
|---|---|---|---|
| 6,125,672 A * | 10/2000 | Diez | 70/226 |
| 6,430,978 B1 * | 8/2002 | Chen | 70/209 |
| 6,543,263 B1 * | 4/2003 | Vito | 70/209 |
| 6,553,797 B1 * | 4/2003 | Witchey | 70/209 |
| 6,901,780 B1 * | 6/2005 | Whinery | 70/209 |
| 6,901,781 B1 * | 6/2005 | Lin | 70/209 |

* cited by examiner

WHEEL IMMOBILIZER

BACKGROUND OF THE INVENTION

1. Field of the Invention

The present invention relates to a device that prevents the rotation and removal of a tire and wheel of a motorized or unmotorized vehicle. Such devices are generally used for two purposes, firstly as a deterrent to theft of the vehicle or the tire and wheels, and secondly as a means to impound the vehicle on the spot.

2. Description of the Related Art

Various devices have been introduced to prevent the movement and removal of vehicle wheels. As an example, U.S. Pat. No. 5,333,477 issued Aug. 2, 1994 to Phillip Davis describes a lightweight, vehicle immobilization device having a hub shield, an adjustable arm, an upper arm and a lower arm. Each of said arms has ends which are adapted to traverse the tread of the tire.

A disadvantage of this device is the inability to conveniently store it when not in use. The ends of the upper, lower and adjustable arms can not be retracted so that the device can lie flat. This prevents compact storage in, for instance, the trunk of a car.

Another disadvantage of this device is the use of rivet style hinge points that are prone to tampering.

A further disadvantage of this device is the inability to adjust the position of the hub shield with respect to the lug nuts either in the direction of the wheels axis or along the wheel's plane. This limits the use of this device with the myriad of wheel and tire shapes and sizes present on the roads at any time.

Yet another disadvantage of this device is the destructive nature of the device towards the tire of the wheel when an attempt is made to move the vehicle while the device is engaged. In such an attempt, a spike punctures the tire and deflates the pressure. When a single device immobilizes a vehicle a punctured tire may impede the effectiveness of the device.

And lastly, earlier devices of this type have generally been relatively difficult to install.

BRIEF SUMMARY OF THE INVENTION

In a first aspect of the present invention is an immobilization apparatus for a vehicle having a wheel with a tire, the apparatus comprising first and second elongated members. Each said member having an inner end and an outer end, the inner ends of the elongated members being connected together and the outer ends thereof being angularly spaced apart. Each of the members having an L-shaped clasp at the outer end thereof for grasping the tire. It is an advantage of the present invention to have clasps being rotatable to permit the members to lie flat when the apparatus is stored. The apparatus further comprises a third elongated member extending outwardly from the inner ends of the first and second members and angularly spaced-apart from the first and second members. The third member being telescopically adjustable with respect to the first and second members and having an outer end with an L-shaped clasp. Again, it is an advantage of the present invention to have the outer end of the third member being rotatable with respect to the inner end to permit the member to lie flat when the apparatus is stored. The apparatus further comprises a locking mechanism for securing the L-shaped clasp of the third elongated member at a fixed telescopic position with respect to the first and second members.

It is preferred in the first aspect of the invention that the apparatus includes a detent mechanism affixed to the outer ends of the first and second elongated members. Additionally, the first aspect of the invention includes a cylindrical member having an inner end and an outer end. The inner end of said cylindrical member having an annular groove with indentations appropriately spaced along the annular groove. The outer end of the cylindrical member is affixed to the L-shaped clasp of the first and second elongated members and the inner end is inserted rotatably into said first or second elongated member such that the detent mechanism engages the annular groove. Furthermore, a slot may be provided between the annular groove and the outer end of the cylindrical member which allows the detent mechanism to pass through. It is an advantage of the present invention that the cylindrical member can be removed from the first and second elongated members. It is a further advantage of the present invention that, when the apparatus is deployed and the cylindrical member and L-shaped clasp are rotated to the deployed position, they cannot be rotated to the removal position until the entire apparatus is disengaged.

In a second aspect of the present invention is an immobilization apparatus for a vehicle having a wheel with a tire, the apparatus comprising first and second elongated members, each said member having an inner end and an outer end. The inner ends of the elongated members being connected together and the outer ends thereof being angularly spaced apart. Each of the members having an L-shaped clasp at the outer end thereof for grasping the tire. The apparatus further comprising a third elongated member extending outwardly from the inner ends of the first and second members and angularly spaced-apart from the first and second members. The third member being telescopically adjustable with respect to the first and second members and having an outer end with an L-shaped clasp. The apparatus further comprising a locking mechanism for securing the L-shaped clasp of the third elongated member at a fixed telescopic position with respect to the first and second members. The third elongated member having a plurality of spaced apart recesses. It is an advantage of the present invention for the locking mechanism to have a projection selectively engageable with one of the recesses to secure the third elongated member in a selected telescopic position with respect to the first and second members. It is another advantage of the present invention that a key is required to deploy the apparatus. It is a further advantage of the present invention that the locking mechanism may be used to hold the apparatus together in a flat position for transport.

It is preferred in the second aspect of the invention that the locking mechanism comprises a lock cylinder and a lock housing with an outer end and an inner end wherein the inner end is affixed to the third elongated member. The outer end of the lock housing comprises an opening that exposes the lock cylinder. The inner end of the lock housing also comprises an opening that allows the projection of the lock to extend through and engage said recesses along the third elongated member.

In a third aspect of the present invention is an immobilization apparatus for a vehicle having a wheel with a tire, the apparatus comprising first and second elongated members, each said member having an inner end and an outer end. The inner ends of the elongated members being connected together and the outer ends thereof being angularly spaced-apart. Each of the members having an L-shaped clasp at the outer end thereof for grasping the tire. The apparatus further comprising a third elongated member extending outwardly from the inner ends of the first and second members and angularly spaced apart from the first and second members. The third member being telescopically adjustable with respect to the first and second members and having an outer end with an L-shaped clasp. The apparatus further comprising a locking mechanism for securing the L-shaped clasp of the third elongated member at a fixed telescopic position with respect to the first and second members. The apparatus yet further comprising a wheel fastener cover operable to prevent access to at least one wheel fastener, in this case a bolt, from a wrench or other similar device capable of removing the wheel fastener from the wheel. It is another advantage of the present invention for the wheel fastener cover being adjustably connected to the first and second elongated members adjacent to the inner ends thereof for fitting different size wheels. It is yet another advantage of the present invention in that the wheel fastener cover allows for installation without removal of decorative hub covers commonly used in conjunction with newer trailer wheels.

It a preferred embodiment of the third aspect of the invention the third elongated member further comprises a slot that engages the wheel fastener cover. Additionally it is preferred that the wheel fastener cover comprises a disc with a flange and a projection mounted on the disc and extending in a direction opposite the flange, the projection engaging the slot in the third elongated member.

In another preferred embodiment of the third aspect of the invention the projection is mounted off-center with respect to the disc, providing adjustable spacing between the disc and the inner ends of the first and second elongated members when the disc is rotated to two different rotational positions relative to the first and second members.

Another advantage of the present invention is that it is more robust in construction and less subject to tampering than units with rivet style hinge points.

BRIEF DESCRIPTION OF THE DRAWINGS

The present invention will be more readily understood from the following description of preferred embodiments thereof given, by way of example, with reference to the accompanying drawings, in which.

DESCRIPTION OF THE PREFERRED EMBODIMENTS

Figure 1:
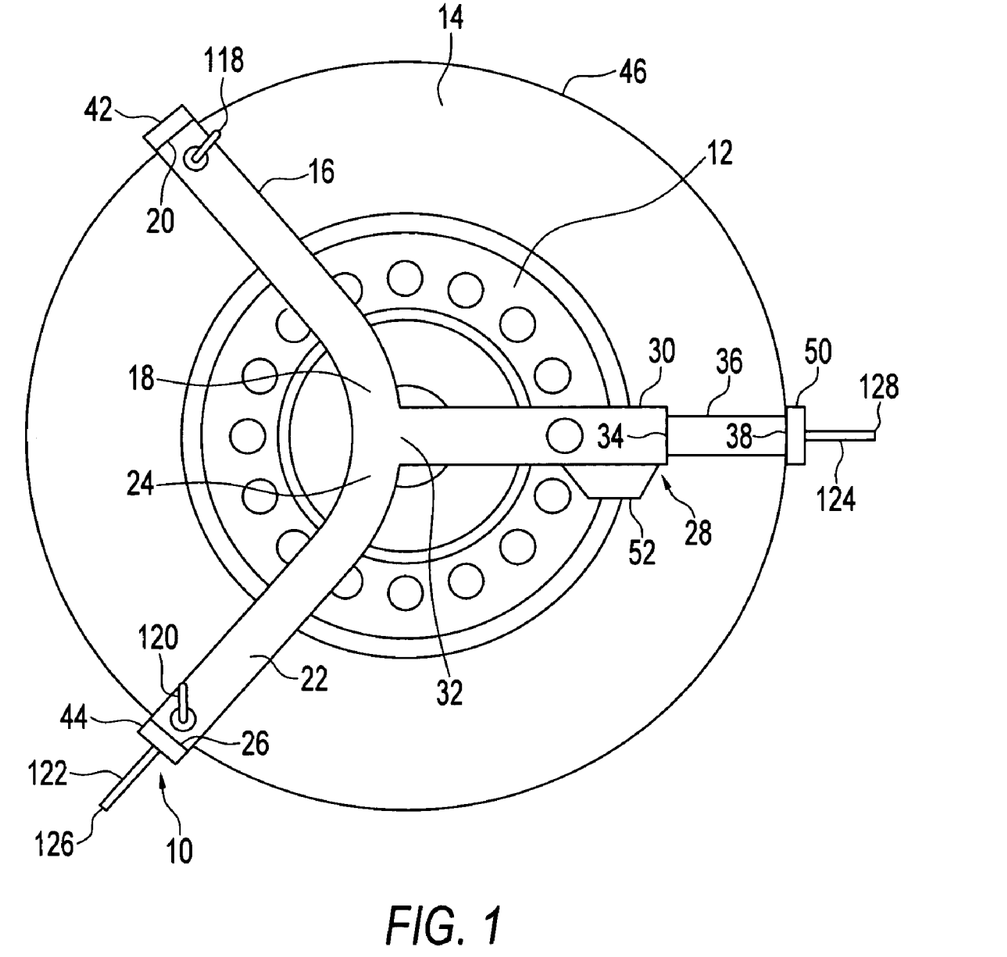
FIG. 1 is a side view of a wheel immobilizer according to an embodiment of the invention, shown installed on a wheel and tire.
Figure 2:
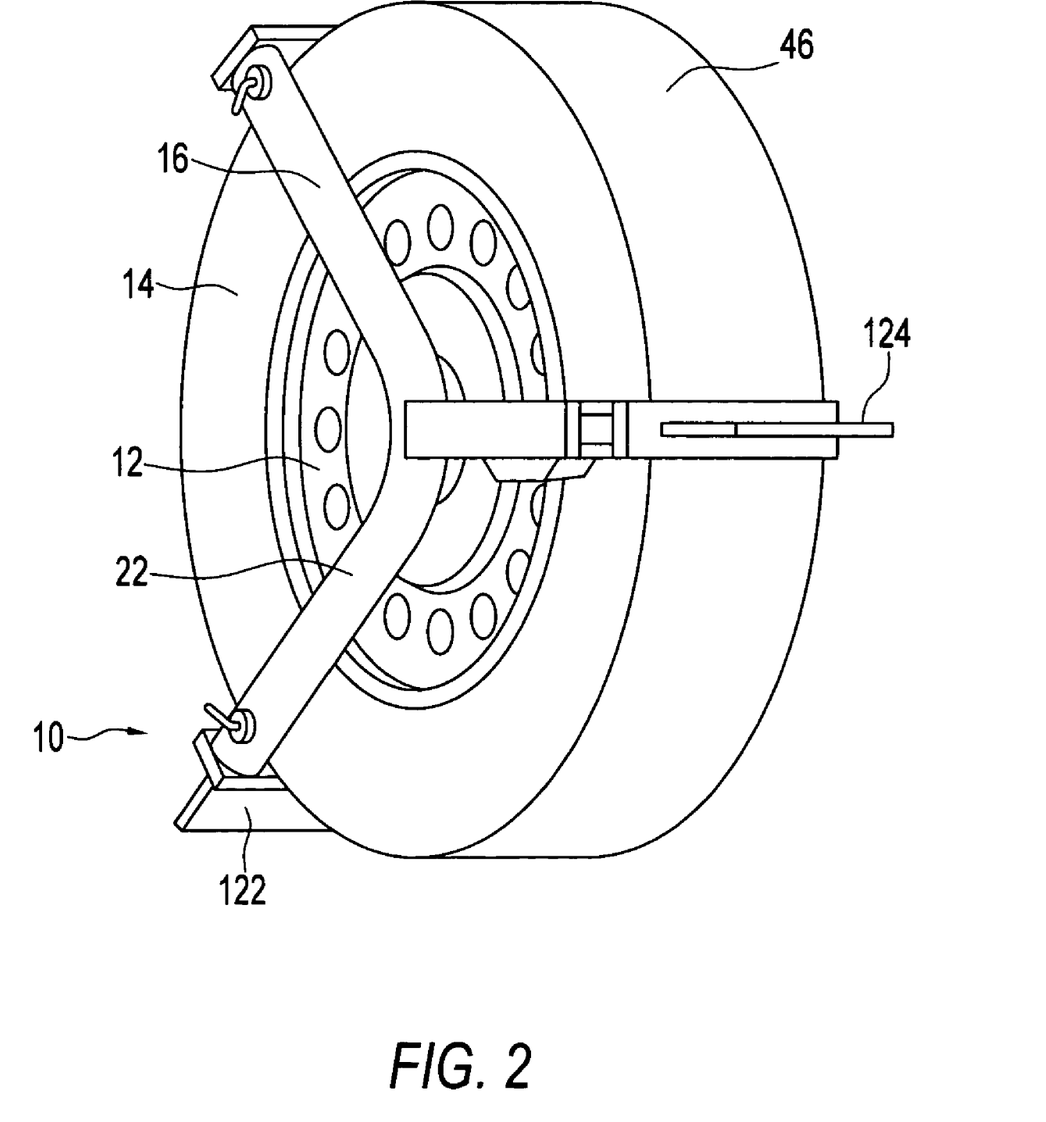
FIG. 2 is a perspective view of the wheel immobilizer, tire and wheel of FIG. 1.
Figure 3:
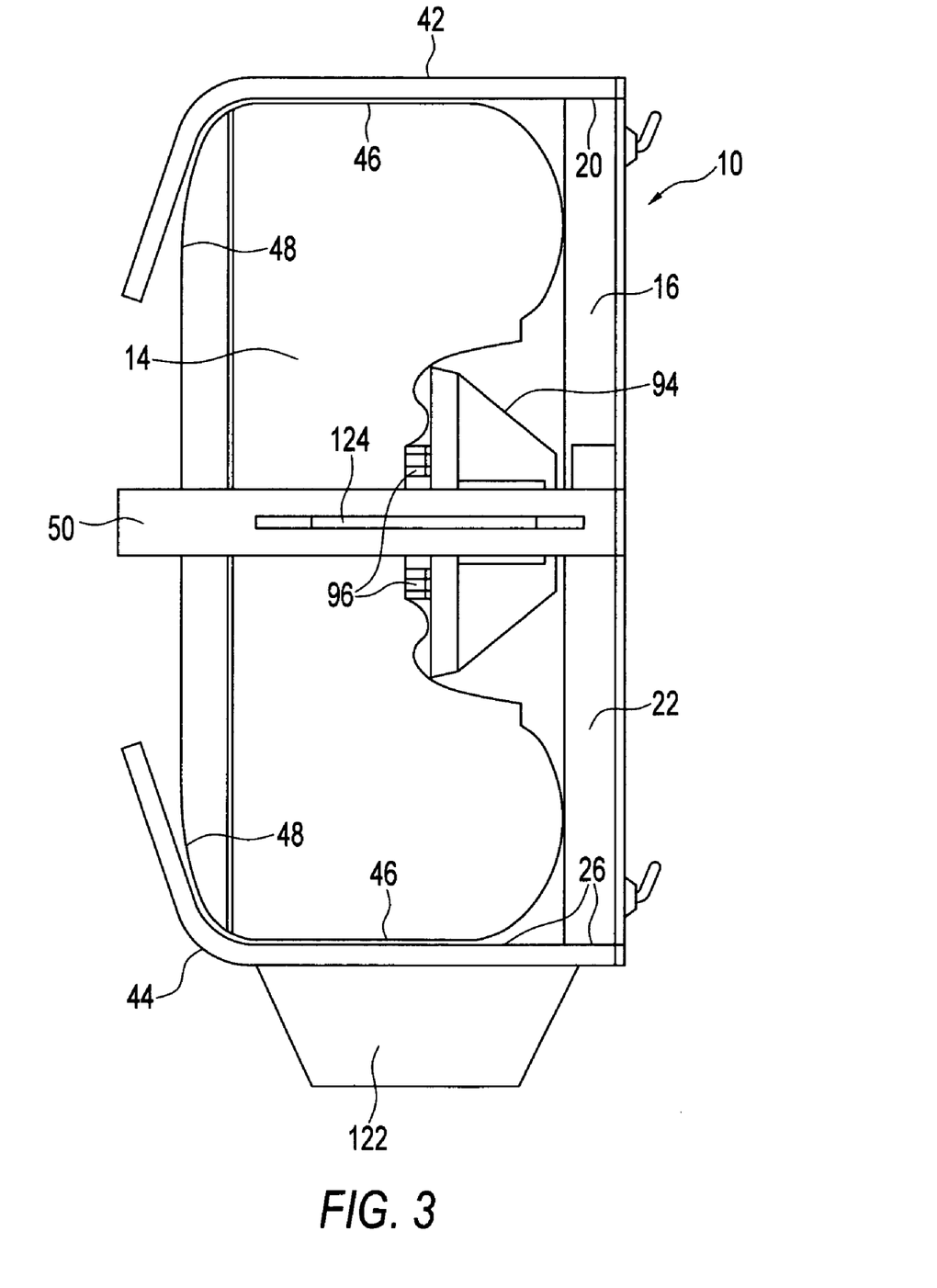
FIG. 3 is an end view of the wheel immobilizer of FIG. 1.

In FIGS. 1 through 3, there is shove a wheel immobilizer indicated generally by reference numeral 10 installed on a wheel 12 for a vehicle and a tire 14. As shown in FIG. 1, there is a first elongated member 16 with an inner end 18 and an outer end 20, and a second elongated member 22 with an inner end 24 and an outer end 26. The inner ends 18 and 24 of the elongated members 16 and 22 respectively are joined together and the outer ends 20 and 26 thereof are angularly spaced apart. In a preferred embodiment, elongated members 16 and 22 are formed from a single piece of metal tubing by bending the tube about its midpoint.

Figure 4:
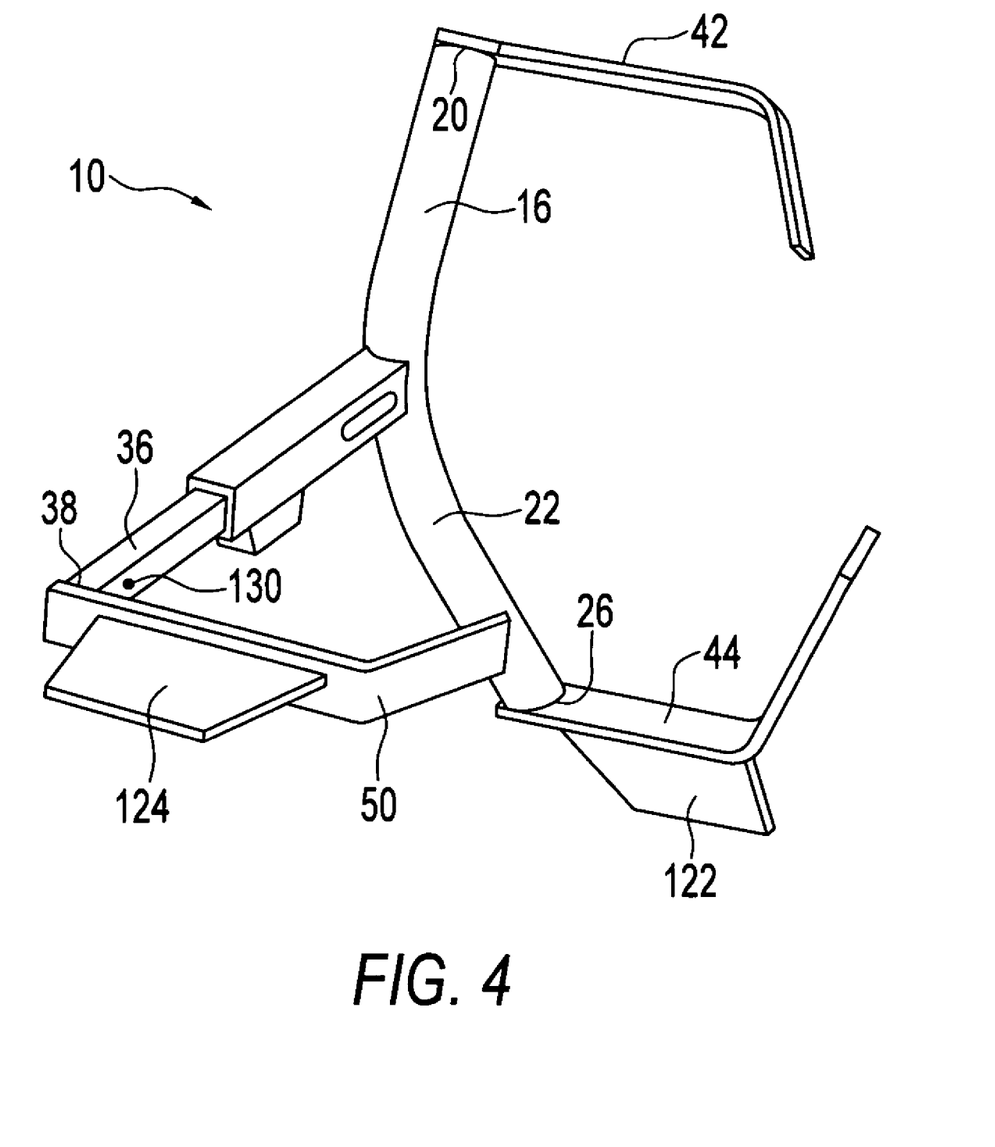
FIG. 4 is a perspective view of the wheel immobilizer of FIG. 1.

Referring now to FIGS. 3 and 4, an L-shaped clasp 42 is shown attached to the outer end 20 of elongated member 16, and another L-shaped clasp 44 is shown attached to the outer end 26 of the elongated member 22. The L-shaped clasps 42 and 44 extend over the tread 46 of tire 14 and overlaps inner side-wall 48 of the tire.

Figure 5:
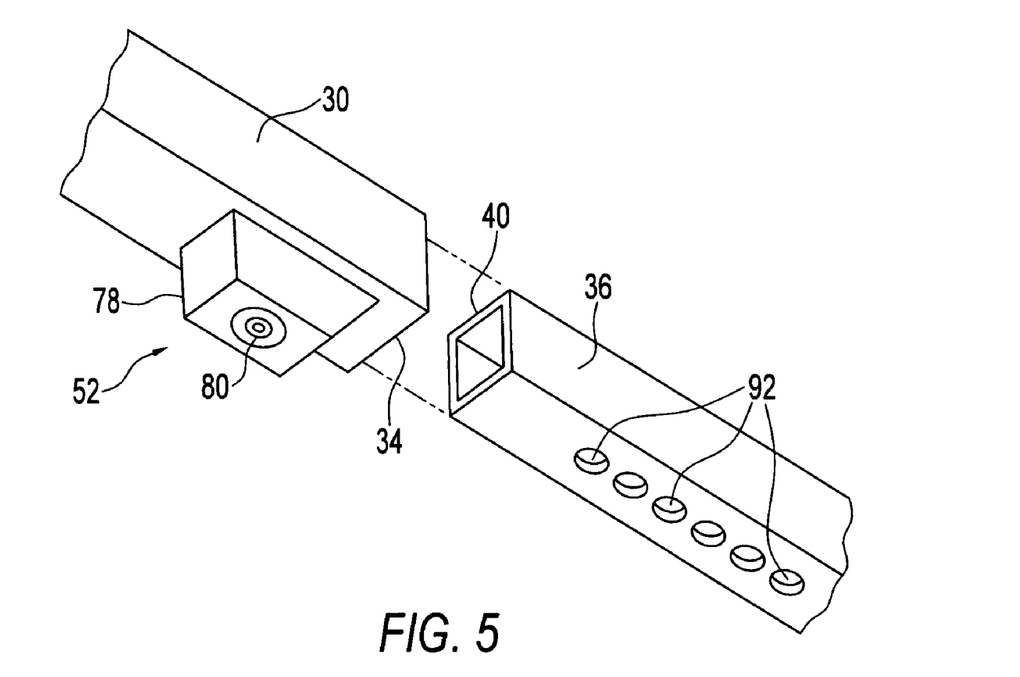
FIG. 5 is an enlarged, fragmentary, perspective view of the telescoping member thereof.
Figure 6:
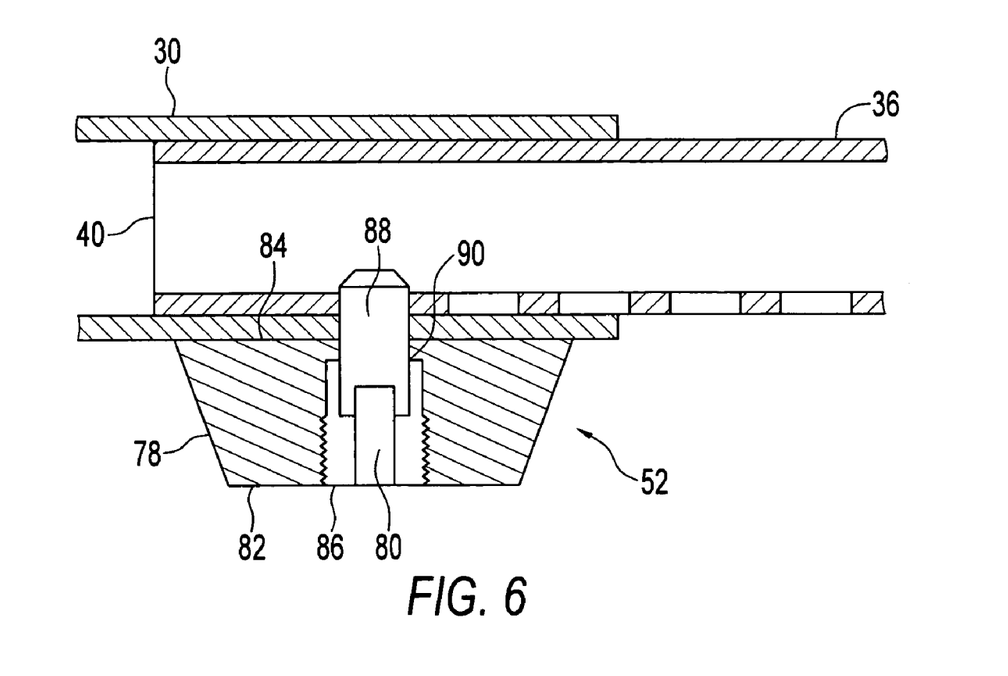
FIG. 6 is a sectional view of the engaged elements of the telescoping member of FIG. 5 with the locking mechanism activated.

Referring back to FIG. 1, a third elongated telescoping member, indicated generally by reference numeral 28, has a fixed elongated member 30 with an inner end 32 and an outer end 34, and an adjustable member 36 with an outer end 38. As shown in FIGS. 5 and 6 the adjustable member 36 also has an inner end 40. The member 30 in this example is tubular and member 36 is telescopically received within it. Referring again to FIG. 1, the inner end 32 of the fixed member 30 is attached to the inner ends 18 and 24 of the elongated members 16 and 22 respectively. The outer end 34 extends outwardly from the inner ends 18 and 24 and thereof is angularly spaced apart from the outer ends 20 and 26.

FIG. 4 shows an L-shaped clasp 50 attached to the outer end 38 of the adjustable member 36. Shown in FIG. 3, the L-shaped clasp 50 extends over the tread 46 of tire 14 and overlaps the inner side-wall 48.

Referring back to FIG. 1, the telescoping member 28 has a locking mechanism 52 to secure the adjustable member 36 and clasp 50 at a specific position with respect to the inner ends 18 and 24 of the elongated members 16 and 22 respectively. The adjustable member 36 is locked into position so that the clasp 50 fits firmly against the tread 46 of tire 14.

Figure 7:
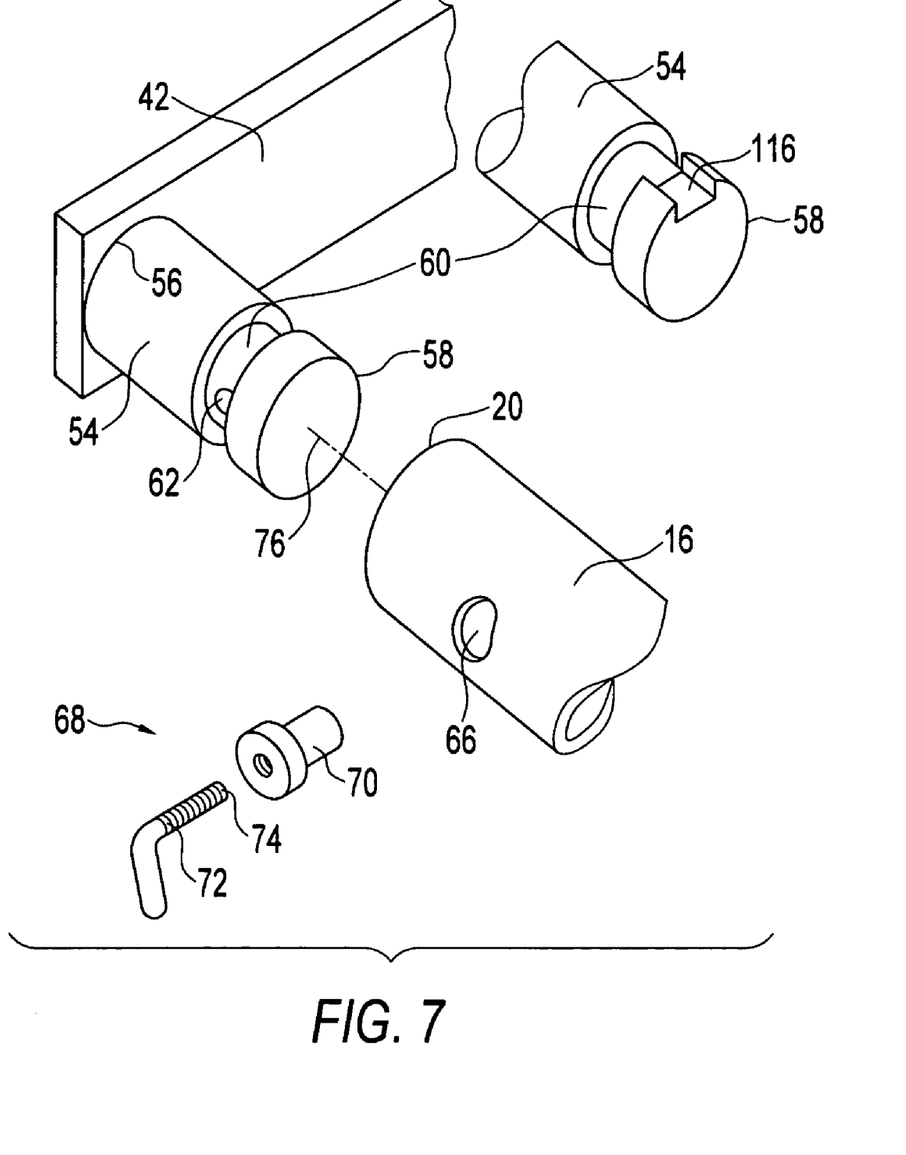
FIG. 7 is a fragmentary, perspective, exploded view of the rotatable end of either the first or second elongated member, including two versions of the cylindrical member, a portion of the L-shaped clasp, either the first or second elongated member, the threaded tube and the screw with protuberant end.

In this preferred embodiment, the clasps 42 and 44 are rotatably connected to elongated members 16 and 22 respectively. FIG. 7 illustrates the mechanism that rotatably attaches clasp 42 to member 16. A similar mechanism exists for attaching clasp 44 to member 22. As shown in FIG. 7, a cylindrical member 54 has an outer end 56 and inner end 58. An annular groove 60 is located near the inner end 58 of cylindrical member 54. Indentations 62 in the form of conical holes are spaced at 90 degree increments along the annular groove 60. The clasp 42 attaches to the outer end 56.

In this preferred embodiment, the elongated member 16 is tubular and has an opening 66 near outer end 20. The inner end 58 of the cylindrical member 54 is rotatably inserted into the outer end 20 such that the cylindrical member 54 and elongated member 16 have a common axis 76, and the annular groove 60 aligns with the opening 66.

Figure 11:
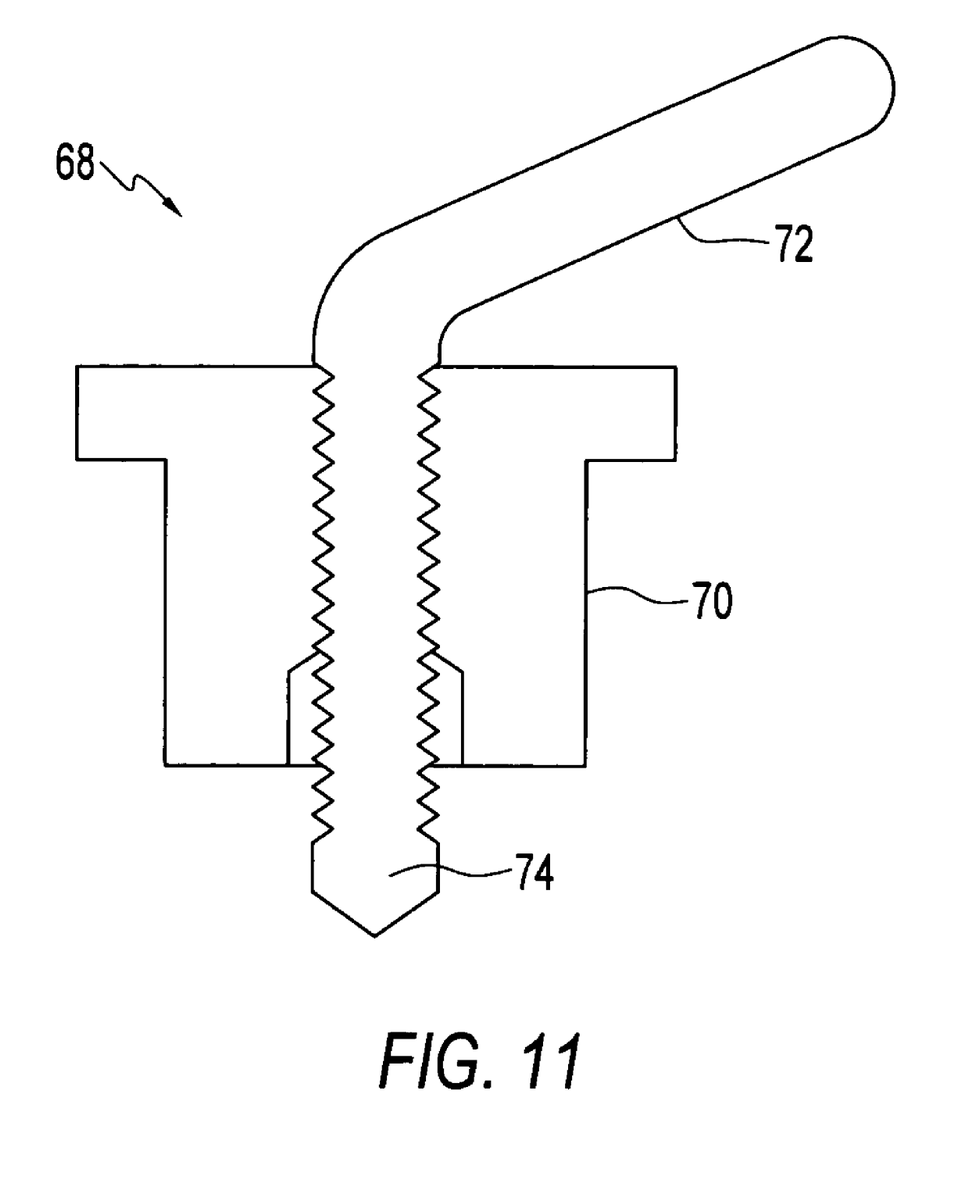
FIG. 11 is a cross-sectional view of the screw with protuberant end and the threaded tube with the screw in the extended position.

A detent mechanism referred to generally with reference numeral 68 is used to secure the cylindrical member 54 to the elongated member 16. The detent mechanism comprises a tube 70 that is interiorly threaded; and a screw 72 with a protuberant end 74, the screw being threadedly received in the tube with the protuberant end 74 extending beyond the tube 70 as best shown in FIG. 11. Referring again to FIG. 7, the tube 70 is inserted into opening 66 and non-removably attached to elongated member 16, for example by welding. The tube 70 engages the annular groove 60, preventing the removal of cylindrical member 54 from elongated member 16. The L-shaped clasp 42 and cylindrical member 54 is rotatable about the common axis 76.

In another preferred embodiment, cylindrical member 54 has a slot 116 between the annular groove 60 and the outer end 58 along a portion of the perimeter of the annular groove 60 such that the tube 70 can pass through the slot 116, for removing the cylindrical member 54 from the elongated member 16. Note that the tube 70 cannot be aligned with slot 116 while the apparatus 10 is in the deployed position on a wheel 12 and tire 14. Consequently the cylindrical member 54 cannot be disassembled from the elongated member 16 in the deployed position.

The cylindrical member 54 and L-shaped clasp 42 are selectively prevented from rotating by threading the screw 72 inwardly such that the protuberant end 74 engages one of the indentations 62 in the recessed annular groove 60. This provides positive positioning in both the deployed and storage positions.

During operation the clasps 42 and 44 are rotated such that they engage the tread 46 and the inner side-wall 48 of the tire 14. During storage the clasps 42 and 44 are rotated such that they lie in a plane formed by elongated members 16, 22 and 28. This provides for convenient storage in, for instance, a trunk of a car.

As shown in FIG. 6, the locking mechanism 52 comprises a lock housing 78 and a lock cylinder 80. The lock housing 78 has an outer face 82 and a inner face 84, the inner face being affixed to the fixed member 30. The outer face 82 has an opening 86 through which the lock cylinder 80 is exposed. The lock cylinder 80 has a projection 88 which extends through an opening 90 in the inner face 84.

In this preferred embodiment the fixed member 30 and adjustable member 36 are tubular, as shown in FIG. 5. The adjustable member 36 further comprising appropriately space indentations 92 along its length. In this case the indentations are apertures. In operation the inner end 40 is inserted into the outer end 34 such that the L-shaped clasp 50 extends over the tread 46 and inner side-wall 48 of tire 14, as shown in FIGS. 1 through 3. Referring back to FIG. 5, the adjustable member 36 may be inserted at various distances into fixed member 30. For a specific size wheel 12 and tire 14 the clasp 50 engages the tread 46 at a specific insertion depth, the adjustable member 36 is locked in place by activating the lock cylinder 80 whereby the projection 88 engages an indentation 92.

In storage, the adjustable member 36 can be removed from the fixed member 30 and stored separately, or reinserted such that the clasp 50 lies in the plane formed by the elongated members 16, 22 and 28.

Figure 8:
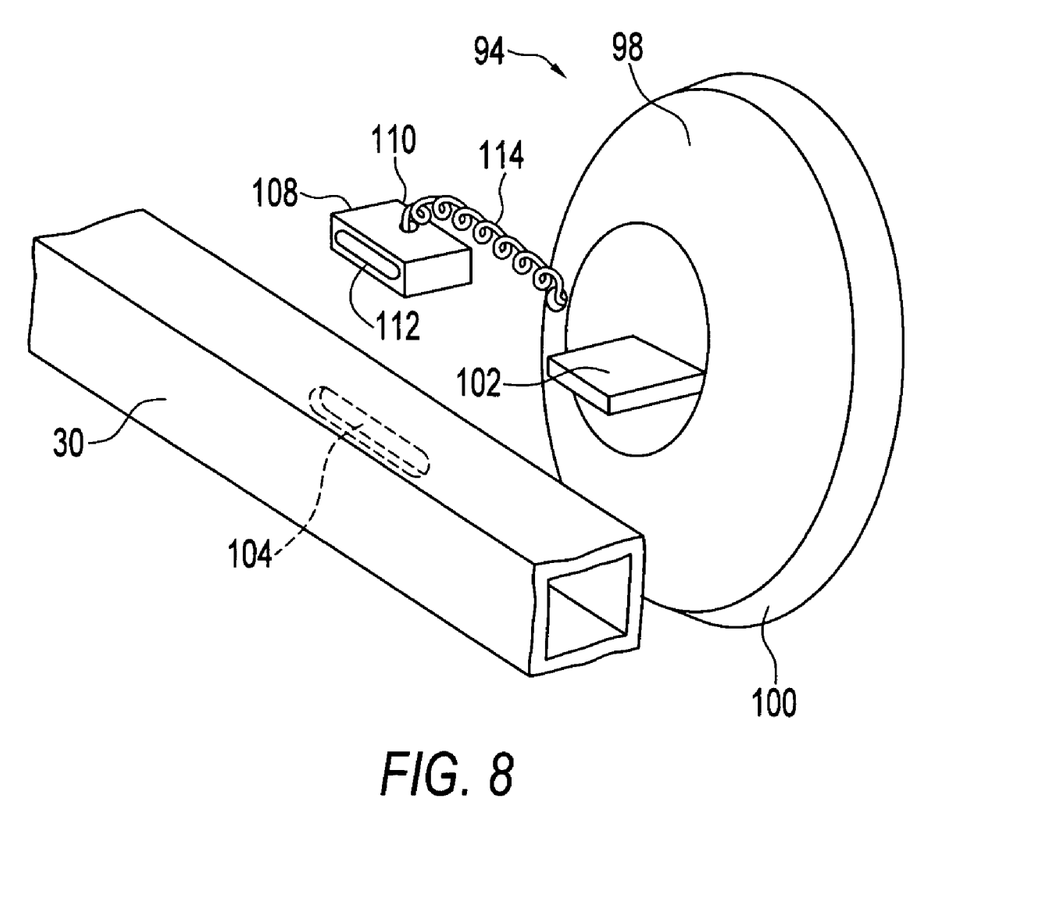
FIG. 8 is a fragmentary, perspective view of the wheel fastener cover shown removed from the telescoping elongated member.
Figure 9:
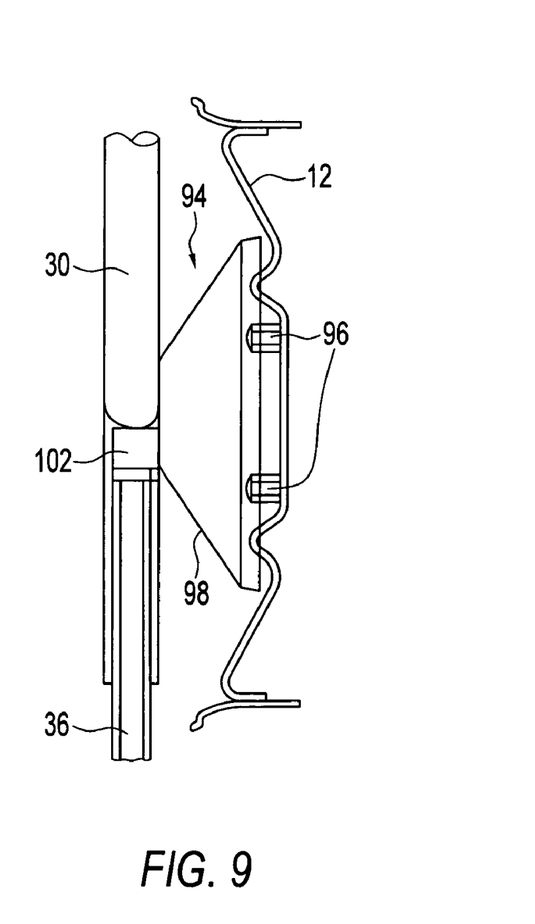
FIG. 9 is a fragmentary, side view of the engaged wheel fastener cover in one rotational position with the telescoping member.
Figure 10:
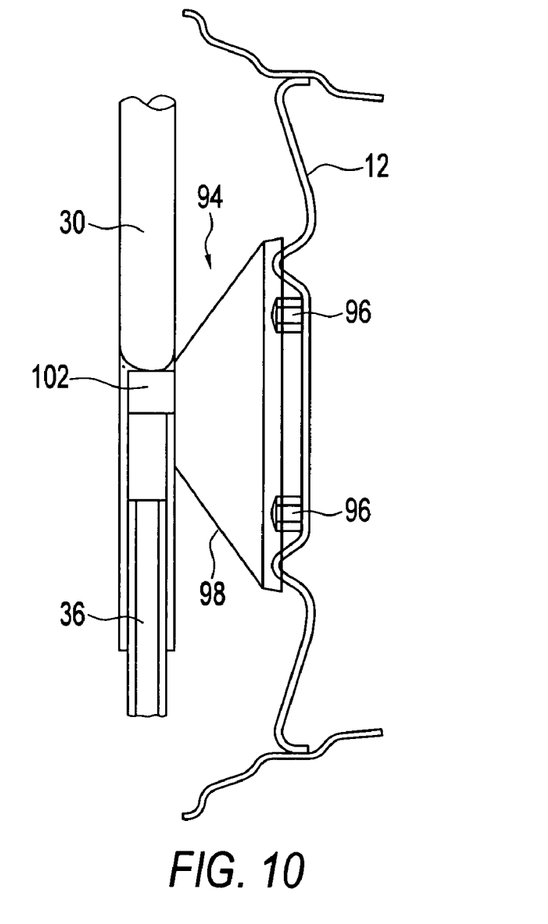
FIG. 10 is a fragmentary, side view similar to FIG. 9 with the engaged wheel fastener cover in a second rotational position with the telescoping member.

Referring now to FIG. 3 a wheel fastener cover assembly 94 is shown covering the wheel fasteners 96 to prevent access by a wrench or similar device to remove the fasteners 96. The construction of the wheel fastener cover assembly 94 is best shown in FIG. 8. The wheel fastener cover assembly 94 comprises a disc 98 with a flange 100, and a projection 102 mounted on the disc 98 and extending in a direction opposite the flange 100. As best shown in FIGS. 9 and 10, the wheel fastener cover assembly 94 is held in place by the projection 102 engaging a slot 104 in the fixed member 30 and the flange 100 engaging wheel 12 thereby enveloping wheel fasteners 96. The projection 102 is mounted off-center with respect to the disc 98, providing adjustable spacing between the disc 98 and the inner ends 18 and 24 of the elongated members 16 and 22 respectively when the disc 98 is rotated to two different rotational positions relative to the elongated members 16 and 22. The first rotational position is shown in FIG. 9 and the second rotational position is shown in FIG. 10. This is useful to accommodate various size wheels.

Again referring to FIG. 8, to further accommodate various size wheels 12 and tires 14 a spacer 108 with an inner end 110 and an outer end 112 can be used. The spacer in this example is a flatened tube. The inner end 110 engages the projection 102 and the outer end 112 engages the slot 104 thereby providing an extension for the wheel fastener cover assembly 94. A flexible member 114, in this example a chain, is used to attach the spacer 108 to the disc 98.

Projections 122 and 124 further hinder rotation of a wheel with an immobilizer apparatus installed. In this embodiment the projection is a metal plate. The projections 122 and 124 extend radially outward from the L-shaped clasps 44 and 50 respectively. When the vehicle is attempted to be moved with the immobilizer installed either projection 122 or 124 will make contact with the ground. Further rotation of the wheel at this point can only occur by pivoting the wheel 12, the tire 14 and a portion of a vehicle about the end 126 of projection 126 or end 128 of projection 124.

In use, the wheel immobilizer is mounted on a tire and wheel of a vehicle by the following procedure. The operator first adjusts the L-shaped clasps 42 and 44 so that they extend across the tread 46 and over-lap the inner side-wall 48. This is accomplished by threading the screws 118 and 120 outwardly away from the conical indentations 62, rotating the clasps 42 and 44 into the above orientation, and then rotating the screws 118 and 120 inwardly towards and engaging the conical indentations 62. Next the operator adjusts the telescoping elongated member 28 outwardly such that it extends beyond the tread 46 when the clasps 42 and 44 are firmly pressed against the tread. This is accomplished by unlocking the lock cylinder 80 with a key and slidably adjusting the adjustable member 36 outwardly. Note, if the clasp 50 is not orientated in the same manner as clasps 42 and 44 then the adjustable member 36 must be removed completely from the fixed member 30 and then reinserted such that the orientation of clasp 50 is correct. The operator then engages the wheel fastener cover 94 with the slot 104 in the fixed member 30. Next the operator mounts the apparatus on the wheel and tire. This is accomplished by first engaging the clasps 42 and 44 with the tread 46, then engaging the wheel fastener cover 94 with the wheel 12, and lastly by slidably adjusting the member 36 inwardly such that clasp 50 engages tread 46. If the wheel fastener cover 94 is not preventing access to at least one wheel fastener 96 then the position of the wheel fastener cover may be adjusted. The wheel fastener cover 94 can be adjusted by rotating it 180 degrees, or by adding the spacer 108 between the fixed member 30 and the projection 102. Once all the clasps are firmly pressed against the tread 46 and on the inner side-wall 48 the lock cylinder 80 is activated with a key holding the apparatus in place.

When the apparatus 10 is deployed on a wheel 12 and tire 14, the clasps 42, 44 and 50 cannot be rotated. The apparatus 10 must first be removed from wheel 12 and tire 14. This is accomplished by unlocking the lock cylinder 80 with a key, and slidably adjusting member 36 outward such that clasp 50 disengages the tread 46. Clasps 42 and 44 can next be disengaged from tread 46 by moving the whole apparatus accordingly. Member 36 is adjusted outward far enough such that all clasps, 42, 44 and 50 have clearance from tire 14. When the clasps 42, 44 and 50 have clearance with tire 14 the apparatus can be removed from the wheel 12 and tire 14 assembly completely. At this point the clasps 42, 44 and 50 can be rotated into the flat, storage position.

Figure 12:
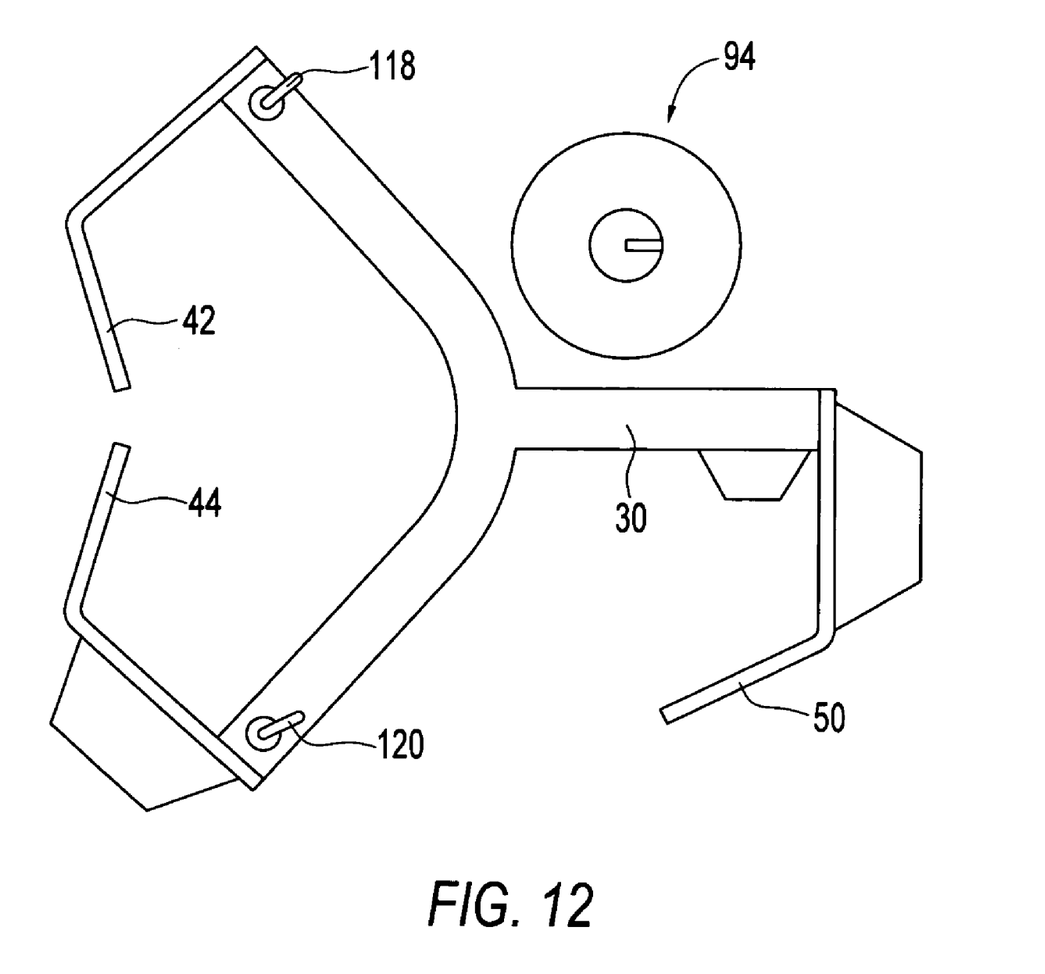
FIG. 12 is a plan, partly disassembled view of the apparatus in the flat storage position.

In storage, the wheel immobilizer is adjusted to lie flat as illustrated in FIG. 12 according to the following procedure. The operator first adjusts clasps 42 and 44 to lie flat. This is accomplished by threading screws 118 and 120 outwardly such that the protuberant end 74 disengages the indentation 60, rotating the clasps 42 and 44 into a flat position, then threading the screws 118 and 120 inwardly such that the protuberant end 74 engages the indentation 60. The operator using a key then unlocks the lock cylinder 80 and then removes the adjustable member 36 completely from the fixed member 30 and then reinserts the member 36 such that clasp 50 is in a flat position. The storage recess 130 in the adjustable member 36, shown in FIG. 4, is used to secure the adjustable member 36 during storage. The operator using a key then locks the lock cylinder 80 such that the projection 88 engages the storage recess 130.

As will be apparent to those skilled in the art, various modifications may be made within the scope of the appended claims.

What is claimed is:

1. An immobilization apparatus for a vehicle having a wheel with a tire, the apparatus comprising:
   a. a first elongated member and a second elongated member, each said elongated member being tubular, having an inner end, an outer end and a recess located at the outer end thereof, the inner end of the first elongated member and the inner end of the second elongated member being connected together and the outer ends thereof being angularly spaced apart, said each elongated member having an L-shaped clasp at the outer end thereof for grasping the tire, each said clasp being rotatable about the outer end of one of said elongated members to permit said elongated members to lie flat when the apparatus is stored;
   b. a third elongated member having an inner portion and an outer portion, the third elongated member extending outwardly from the inner ends of the first and second elongated members and the third elongated member being angularly spaced-apart from the first and second elongated members, the inner portion of the third elongated member being tubular and the outer portion of the third elongated member being telescopically received therein, the outer portion of the third elongated member having an outer end with an L-shaped clasp, and the outer portion of the third elongated member being rotatable with respect to the inner portion of the third elongated member to permit the third elongated member to lie flat when the apparatus is stored; and
   c. a locking mechanism for securing the outer portion of the third elongated member at a fixed telescopic position with respect to the inner portion of the third elongated member;
   d. a first detent mechanism affixed to the outer end of the first elongated member, and a second detent mechanism affixed to the outer end of the second elongated member;
   e. a first cylindrical member having an inner end, an annular groove near the inner end with indentations spaced-apart along each said annular groove, and an outer end, the outer end of the first cylindrical member being located adjacent the outer end of the first elongated member and affixed to the L-shaped clasp of the first elongated member, and the inner end of the first cylindrical member being inserted rotatably into the recess of the first elongated member such that the first detent mechanism engages the annular groove of the first cylindrical member; and
   f. a second cylindrical member having an inner end, an annular groove near the inner end with indentations spaced-apart along said annular groove, and an outer end, the outer end of the second cylindrical member being located adjacent the outer end of the second elongated member and affixed to the L-shaped clasp of the second elongated member, and the inner end of the second cylindrical member being inserted rotatably into the recess of the second elongated member such that the second detent mechanism engages the annular groove of the second cylindrical member.

2. The immobilization apparatus of claim 1 wherein each said detent mechanism comprises:
   a. a tube that is interiorly threaded; and
   b. a screw with a protuberant end, the screw being threadedly received in the tube with the protuberant end extending beyond the tube;
   wherein the tube of the first detent mechanism protrudes inwardly into the first elongated member and engages the annular groove of the first cylindrical member such that the first cylindrical member cannot be removed from the first elongated member, the first cylindrical member and L-shaped clasp of the first elongated member being selectively prevented from rotating by threading the screw of the first detent mechanism inwardly such that the protuberant end of the screw of the first detent mechanism engages one of the indentations in the annular groove of the first cylindrical member, and wherein the tube of the second detent mechanism protrudes inwardly into the second elongated member and engages the annular groove of the second cylindrical member such that the second cylindrical member cannot be removed from the second elongated member, the second cylindrical member and L-shaped clasp of the second elongated member being selectively prevented from rotating by threading the screw of the second detent mechanism inwardly such that the protuberant end of the screw of the second detent mechanism engages one of the indentations in the annular groove of the second cylindrical member.

3. The immobilization apparatus of claim 2 wherein each said tube has a cross sectional extent and each said protuberant end has a cross sectional extent, the cross sectional extent of said each tube being smaller than the cross sectional extent of said each protuberant end whereby said protuberant ends cannot be threaded through said tubes.

4. The immobilization apparatus of claim 2 wherein a slot extends from each said annular groove to the inner end of one of said cylindrical members along a portion of a perimeter of said annular groove such that one of said tubes can pass through the slot, for removing one of said cylindrical member from the elongated member.

5. An immobilization apparatus for a vehicle having a wheel with a tire, the apparatus comprising:
   a. a first elongated member and a second elongated member, each said elongated member having an inner end and an outer end, the inner end of the first elongated member and the inner end of the second elongated member being connected together and the outer ends thereof being angularly spaced apart, said each elongated member having an L-shaped clasp at the outer end thereof for grasping the tire, each said clasp being rotatable about the outer end of one of said elongated members to permit said elongated members to lie flat when the apparatus is stored;
   b. a third elongated member having an inner portion and an outer portion, the third elongated member extending outwardly from the inner ends of the first and second elongated members and the third elongated member being angularly spaced-apart from the first and second elongated members, the inner portion of the third elongated member being tubular and the outer portion of the third elongated member being telescopically received therein, the outer portion of the third elongated member having an outer end with an L-shaped clasp, and the outer portion of the third elongated member being rotatable with respect to the inner portion of the third elongated member to permit the third elongated member to lie flat when the apparatus is stored;
   c. a locking mechanism for securing the outer portion of the third elongated member at a fixed telescopic position with respect to the inner portion of the third elongated member;
   d. a wheel fastener cover comprising a disc with a flange and a projection mounted on the disc and said projection extending in a direction opposite the flange, the wheel fastener cover being operable to prevent access to a wheel fastener by a tool, and the wheel fastener cover being adjustably connected to the first and second elongated members adjacent to the inner ends thereof for fitting different size wheels; and
   e. a slot in the third elongated member that engages the projection of the wheel fastener cover.

6. The immobilization apparatus of claim 5 wherein the projection is mounted off-center with respect to the disc, providing adjustable spacing between the disc and the inner ends of the first and second elongated members when the disc is rotated to two different rotational positions relative to the first and second members.

7. The immobilization, apparatus of claim 5 further comprising a spacer with an inner end and an outer end, the inner end engaging the projection and the outer end engaging the slot of the third elongated member to accommodate different size wheels.

8. The immobilization apparatus of claim 7 wherein the spacer is a sleeve.

9. The immobilization apparatus of claim 7 further comprising a flexible member attaching the spacer to the disc.

10. An immobilization apparatus for a vehicle having a wheel with a tire, the apparatus comprising:
   a. a first elongated member and a second elongated member, each said elongated member having an inner end and an outer end, the inner end of the first elongated member and the inner end of the second elongated member being connected together and the outer ends thereof being angularly spaced apart, said each elongated member having an L-shaped clasp at the outer end thereof for grasping the tire, each said clasp being rotatable about the outer end of one of said elongated members to permit said elongated members to lie flat when the apparatus is stored wherein the L-shaped, clasp of the first elongated member is rotatable about an axis of rotation That is parallel to the first elongated member, and the L-shaped clasp of the second elongated member is rotatable about an axis of rotation that is parallel to the second elongated member;
   b. a third elongated member having an inner portion and an outer portion, the third elongated member extending outwardly from the inner ends of the first and second elongated members and the third elongated member being angularly spaced-apart from the first and second elongated members, the inner portion of the third elongated member being tubular and the outer portion of the third elongated member being telescopically received therein, the outer portion of the third elongated member having an outer end with an L-shaped clasp, and the outer portion of the third elongated member being rotatable with respect to the inner portion of the third elongated member to permit the third elongated member to lie flat when the apparatus is stored; and
   c. a locking mechanism for securing the outer portion of the third elongated member at a fixed telescopic position with respect to the inner portion of the third elongated member.

* * * * *